(No Model.)
B. GREIG.
ANIMAL TRAP.
No. 267,518. Patented Nov. 14, 1882.
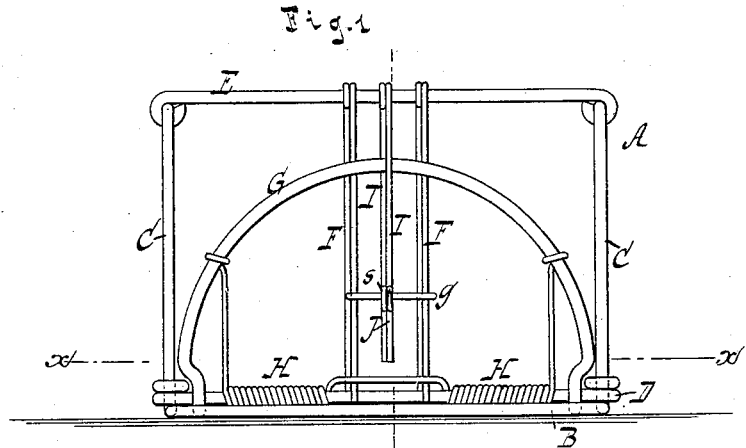
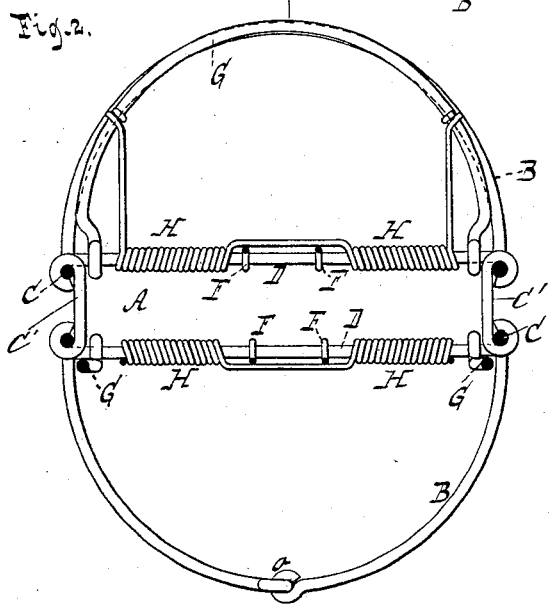
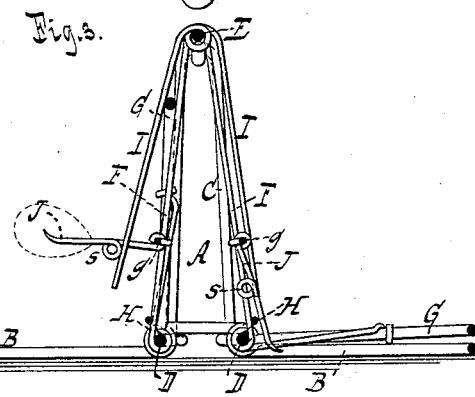
WITNESSES:
Otto Hufeland
William Miller
INVENTOR
Bennet Greig
BY Van Santvoord & Hauff
ATTORNEYS

UNITED STATES PATENT OFFICE.

BENNET GREIG, OF NEW YORK, N. Y.

ANIMAL-TRAP.

SPECIFICATION forming part of Letters Patent No. 267,518, dated November 14, 1882.

Application filed September 9, 1882. (No model.)

*To all whom it may concern:*

Be it known that I, BENNET GREIG, a citizen of the United States, residing at New York, in the county and State of New York, have invented new and useful Improvements in Animal-Traps, of which the following is a specification.

This invention relates to traps for killing rats, mice, and other animals, as also birds; and it consists in the novel combination of parts hereinafter described, whereby a cheap trap is obtained, and one which is extremely effective in operation.

This invention is illustrated in the accompanying drawings, in which Figure 1 represents an end view; Fig. 2, a horizontal section on the line $x\ x$, Fig. 1; and Fig. 3, a vertical longitudinal section.

Similar letters indicate corresponding parts.

The letter A designates the trap-frame, which is formed of wire, and with two horizontal or base sections, B, of approximately bow shape, which project in opposite directions and serve to support the trap on the ground. The junction between these base-sections B is formed by upright limbs C, which are integral therewith—that is to say, both the base-sections, together with the upright limbs, are composed of a single piece of wire, which is united at the ends by interlaced loops $o$—each of the limbs having a return-bend at the upper end and being double. The base-sections are held in proper relative position with the upright limbs adjacent to each other by means of links C', the ends of which are respectively bent around the said upright limbs directly above the base-sections, as clearly shown in Figs. 1 and 2. At the bottom of the upright limbs C, where they join the base-sections B, are two traverses, D, while at the top of the limbs is a single traverse, E, these traverses being parallel to each other, and being joined to the limbs at the opposite ends by suitable loops. To said upper and lower traverses are connected the ends of stretchers F, which are arranged in pairs, those of each pair being joined by a tie, $g$. The position of these stretchers F is intermediate of the upright limbs C at about the center of the trap-frame, and they complete the frame, the same as well as the traverses being composed of wire. To the lower traverses, D, are hung swinging knockers G—one to each traverse—which knockers, like the base-sections B, are of approximately bow shape, they being composed of wire, and having loops at the ends adapted to the traverses. On the lower traverses, D, are arranged springs H in such a manner as to act on the knockers G with a tendency to throw the same in a downward direction, and to the upper traverse, E, are hung swinging braces I, while to a suitable part of the stretchers F are hung triggers J, adapted to engage said braces, the triggers being the parts intended to receive the bait.

When it is desired to set the trap the knockers G are raised against the action of their springs to a perpendicular position, and the braces I are brought over or to the outside thereof. The triggers J are then adjusted to engage the braces when the knockers are held in their raised positions until released by the animal that may disturb the triggers. Both the braces I and the triggers J are composed of wire, and for the purpose of engaging the braces the triggers are provided respectively with a coil, $s$, forming a shoulder to catch the brace concomitant thereto. Each of the springs H of the knockers is double, and its parts or members are coiled in reverse directions, so that both such parts have a like action. Said members of the double springs, moreover, are situated on opposite sides of the stretchers F, that portion of the wire forming the junction between them extending across the stretchers, and the terminals of the springs are connected to the knockers by suitable loops.

By making the knockers of bow shape they acquire a superior effective area, and are adapted to strike the animal, whether it approaches the bait from the front or toward the side of the trap, and by the arrangement of the springs they are caused to exert an extremely effective action on the knockers, while by the described construction the trap is adapted to be manufactured at low cost.

What I claim as new, and desire to secure by Letters Patent, is—

1. The wire frame embodying in its structure the bow-shaped base sections projecting in opposite directions to support the trap on the ground, the double upright limbs forming the junctions between the base-sections, the two traverses at the bottom of the upright limbs, the single traverse at the top thereof, and the stretchers connected to the upper and lower traverses, in combination with the bow-shaped swinging knockers hung to the lower traverses, the springs arranged on such traverses to act on the knockers with a tendency to throw the same in a downward direction, the swinging braces hung to the upper traverse for retaining the knockers in a raised position, and the bait-holding triggers hung to the stretchers for engaging the braces, substantially as and for the purpose described.

2. The combination, with two united stationary base-sections, each provided with a traverse, D, of a bow-shaped knocker loosely hung at its ends on each of said traverses, a spring coiled on each traverse and acting on the knockers, and means for holding the two knockers in an upright position, substantially as described.

In testimony whereof I have hereunto set my hand and seal in the presence of two subscribing witnesses.

BENNET GREIG. [L. S.]

Witnesses:
W. HAUFF,
E. F. KASTENHUBER.